United States Patent [19]
Koch et al.

[11] Patent Number: 5,118,225
[45] Date of Patent: Jun. 2, 1992

[54] FIBER-LOADING APPARATUS AND METHOD OF USE

[75] Inventors: Charles E. Koch, Greenfield; Thomas M. Irving, Woodburn, both of Ind.

[73] Assignee: Nycon, Inc., Westerly, R.I.

[21] Appl. No.: 725,229

[22] Filed: Jun. 26, 1991

Related U.S. Application Data

[63] Continuation of Ser. No. 470,912, Jan. 25, 1990, abandoned.

[51] Int. Cl.$^5$ .............................................. B65G 53/40
[52] U.S. Cl. ................................. 406/144; 406/194
[58] Field of Search .............. 406/144, 57, 191, 192, 406/196, 56, 121, 61, 194, 153

[56] References Cited

U.S. PATENT DOCUMENTS

| | | | |
|---|---|---|---|
| 1,112,234 | 9/1914 | Stuart | 406/144 X |
| 1,970,405 | 8/1934 | Thomas | 406/144 X |
| 2,087,464 | 7/1937 | Ayers | 406/56 X |
| 2,532,351 | 12/1950 | Wedebrock | 406/61 |
| 2,673,125 | 3/1954 | Squire, Jr. | 406/94 X |
| 2,755,143 | 7/1956 | Cunningham | 406/196 X |
| 2,834,059 | 5/1958 | Hoelzel | 406/196 |
| 2,946,629 | 7/1960 | Headley | 406/196 X |
| 3,485,535 | 12/1969 | Fabre | 406/61 |
| 3,679,082 | 7/1972 | Gramlich | 406/56 |
| 3,953,077 | 4/1976 | Kulyabko et al. | 406/194 X |
| 4,249,839 | 2/1981 | Vance | 406/191 X |
| 4,453,866 | 6/1984 | Ryan | 406/144 X |
| 4,846,608 | 7/1989 | Sanders | 406/144 |

FOREIGN PATENT DOCUMENTS 267614 11/1988 Japan ................................. 406/144

OTHER PUBLICATIONS

"Fibermesh Engineered Synthetic Fibers for Concrete and Mortars," Fibermesh, Inc., copyright 1985.

*Primary Examiner*—Margaret A. Focarino
*Assistant Examiner*—James M. Kannofsky
*Attorney, Agent, or Firm*—Woodard, Emhardt, Naughton, Moriarty & McNett

[57] ABSTRACT

A transport apparatus for moving nylon fiber from a supply location to a remote location includes a hopper receptacle designed for receiving a supply of nylon fibers at or near ground level, a flexible conduit having a first end connected with the output of the receptacle and the opposite end disposed at the remote location for delivery of the nylon fibers to the remote location. The propelling or transport mechanism which actually moves the nylon fibers from the first end which is connected to the receptacle to the remote location includes an air compressor and output air tube which is inserted into the conduit line. When the air compressor is energized, the pressurized flow of air through the line and thus through the conduit creates a venturi effect which effectively pulls nylon fibers from the receptacle and propels them to the remote location.

5 Claims, 2 Drawing Sheets

FIBER-LOADING APPARATUS AND METHOD OF USE

This application is a continuation of application Ser. No. 07/470,912, filed Jan. 25, 1990, now abandoned.

BACKGROUND OF THE INVENTION

The present invention relates generally to methods and apparata for mixing and working with concrete. More particularly, the present invention relates to mixing and working with nylon or synthetic fibers which are added to concrete in order to enhance the properties of the concrete.

Anyone familiar with concrete and some of the properties as well as tendencies will know that it cracks due to settlement, shrinkage, thermal contractions and long-term drying. For years these tendencies have been accepted as a natural and foreseeable consequence of using concrete. Accordingly, contractors and masons devised ways to compensate for or minimize the magnitude of cracks in concrete as well as how soon the cracks might appear in the finished work.

One development which has shown to be quite successful is the use of small lengths of synthetic fibers such as nylon, polypropylene or polyester. While a number of companies produce such fibers and while descriptive information is similar, reference herein is made to an eight-page product brochure of Fibermesh, Inc., 4019 Industry Drive, Chattanooga, Tenn. 37416, which brochure is entitled "FIBERMESH—Engineered Synthetic Fibers for Concrete and Mortars." Various excerpts from this brochure are paraphrased below in order to provide a more detailed explanation of the synthetic fibers, their use and value.

The tendency for concrete to crack has for years been accepted as natural to its use. There is only one reason that cracks occur in concrete: stresses exist which exceed the strength of the concrete at a specific time. Stresses from external forces can be offset by providing higher structural strength to concrete structures, pavements and slabs. However, the intrinsic stresses caused by shrinkage within the concrete itself have historically been a problem to control because of their unpredictable variety and occurrence. Synthetic fibers automatically provide the dimensional stability to concrete by reducing these intrinsic stresses and relieving them until the concrete has gained sufficient strength to sustain the stresses without cracking. The elimination or reduction of early crack formation substantially reduces the number of weak planes and potential future crack formation due to thermal and drying shrinkage. (See Fibermesh brochure page 2.)

Synthetic fibers provide identical physical properties in every direction throughout the mass. Welded wire fabric is located in but a single plane and does not reduce the tendency for concrete to crack. In the hardened concrete, the presence of millions of synthetic fibers increases the ductility of the concrete; improving its impact, shatter and abrasion resistance. This reduces shattering and fragmentation under shock loading—a real asset for precast products and industrial applications. (See Fibermesh brochure page 2.)

Some fibers which are engineered exclusively for concrete use are manufactured in fibrillated form—bundles of interconnected strands. When these bundles are added to the concrete mix at the rate of 1½ pounds per cubic yard, the mixing action causes them to open and separate into millions of individual fibers. These fibers are uniformly distributed throughout the concrete in all direcions providing effective secondary reinforcement for shrinkage crack control. As the concrete hardens, microscopic cracks develop as a result of plastic and drying shrinkage changes. When these micro-cracks intersect the nearest strand, they are blocked and prevented from developing into macro-cracks and potential problems. (See Fibermesh brochure, page 3.)

The synthetic fibers are packaged in premeasured bags ready for accurate addition to the mixing operation, either at the batching plant or into mixer trucks at the job site. The fibers are distributed throughout the concrete mixture when mixed at the mixer's rate speed and time. Overmixing will not alter its performance. (See Fibermesh brochure page 3.)

In the Fibermesh brochure, the addition of the fibers is illustrated by a photograph showing a worker on a ladder or scaffold at the top of the concrete truck drum where concrete is introduced at the batching plant. The worker has several bags of the fibers set forth in front of him and it is implied by this photograph and by this accompanying text that the bags are opened and the fibers emptied into the drum of the truck and this is in fact what occurs.

While the Fibermesh brochure refers to fibrillated bundles of fibers, other synthetic fibers may be used. For example, Nycon, Inc. of Indianapolis, Ind. produces a monofilament fiber which is believed to be particularly well suited for use with the present invention.

It would be an improvement to the widely used and accepted practice of adding fibers (of any type) if the worker could add the fibers somewhat automatically to the drum from a location at or near ground or floor level. Such an improvement would enhance the worker's safety and enable faster, easier and cleaner loading of fibers. An automated means of loading fibers would also enable more precise and accurate control so that a desired fiber weight or ratio for a particular volume of concrete could be determined and maintained somewhat uniformly, batch after batch. A means for ground level loading of the fibers precludes the need for the operator to climb any ladder or scaffolding and eliminates the need to carry the bags of fibers to the elevated location. There is also no risk that the bags of fibers might fall or split open causing either a risk to worker safety or loss.

The present invention provides the improvements outlined above as will be understood from the description which follows.

SUMMARY OF THE INVENTION

A transport apparatus for moving particulate matter from a supply to a remote location according to a typical embodiment of the present invention includes a receptacle for receiving a supply of particulate matter, a conduit having a first end in flow communication with the receptacle, a second end for delivery of the particular matter to a remote location and defining an enclosed passageway between the first and the second ends and air flow means cooperatively arranged with the conduit for creating a propelling force on the particulate matter in the direction of the second end.

One object of the present invention is to provide an improved transport apparatus for moving concrete synthetic fibers.

DESCRIPTION OF THE PREFERRED EMBODIMENT

Figure 1:
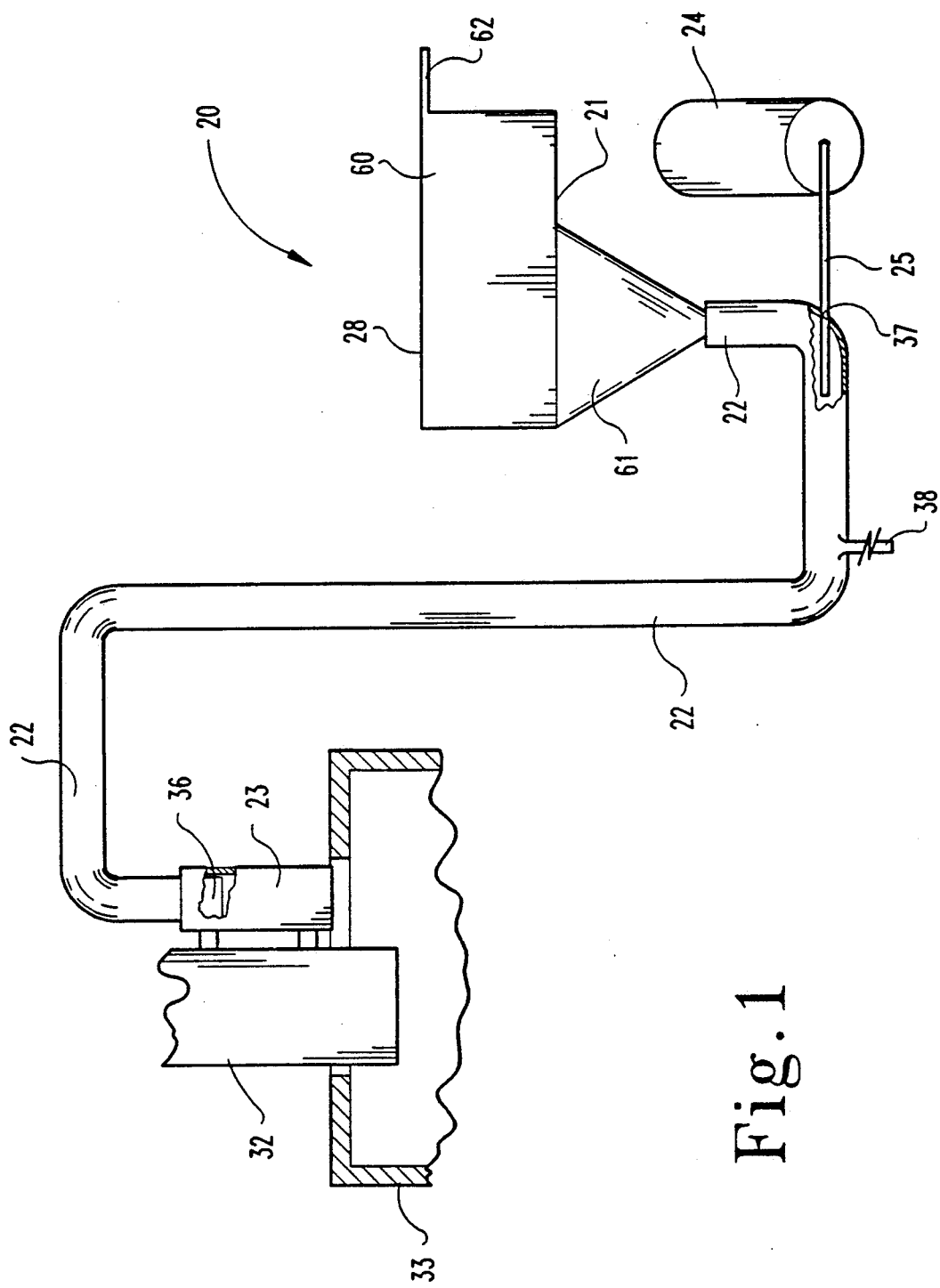
FIG. 1 is a diagrammatic illustration of a transport apparatus for moving particulate matter from a supply location to a remote location according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a fiber-loading apparatus 20 which includes a load hopper 21, transport conduit 22, drum conduit 23, air compressor 24 and air entry line 25.

Figure 1A:
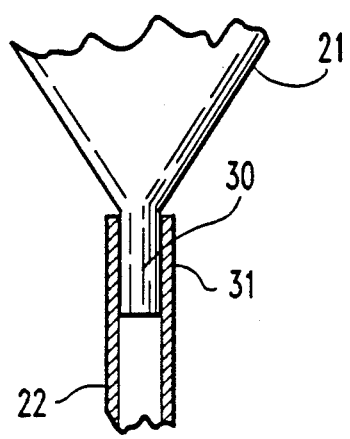
FIG. 1A is a front elevational view in full section illustrating one connection point between component parts of the FIG. 1 apparatus.

The load hopper 21 is open at the top 28 and has a lower tapered portion (funnel) which opens into conduit 22. While the hopper and conduit could conceivably be a single integral member, in the preferred embodiment, the lowered tapered portion of the hopper terminates in a short feed tube 30 which snugly fits inside the free end 31 of conduit 22 (see FIG. 1A). While a snug press fit is anticipated to be sufficient to hold tube 30 and end 31 in the illustrated configuration, a clamp or encircling strap could also be used around end 31 in order to tighten its hold around tube 30.

Hopper 21 is positioned at or near ground or floor level and conduit 22 is routed in any desired fashion from the bottom of the hopper to the location of drum conduit 23 which is alongside of chute 32 which is used to transport concrete into the rotary drum 33 of a ready-mix truck. By locating the hopper at or near ground or floor level and sizing it at no more than 1½ to 2 feet in height, a worker can easily load bags of fibers directly into the open top of the hopper without having to use any step ladder, stool or scaffolding. This portion of FIG. 1 is simply intended to show that while one end (end 31) of conduit 22 is attached to hopper 21, the opposite end of conduit 22 may be routed to virtually any remote location. The hollow enclosed passageway as defined by conduit 22 between the two ends allows the fibers to be transported from one end to the other opposite end without loss or leakage. Conduit 22 is made of a flexible material so that the conduit can be shaped and routed without sharp corners or restrictions to virtually any location and in virtually any manner. This permits the fibers to be directly introduced into the drum of the concrete truck or the fibers could be directly introduced into the concrete at the batching plant prior to loading the concrete mixture into the drums of the trucks.

Drum conduit 23 is designed to be secured adjacent the top fill opening of rotary drum 33 so that there will be a secure and rigid member to receive the free end 36 of conduit 22. By sizing the interior of conduit 23 to snugly fit the outer diameter size of end 36, end 36 may simply be forced into conduit 23 in order to locate and position end 36 in a stationary and secure manner. Conduit 23 may be secured to a nearby superstructure above the drum of the cement truck or the conduit may be secured directly to chute 32 which is in effect a permanent structure for filling of the ready-mix concrete trucks.

The portion of apparatus 20 which provides the driving or propelling force to move the fibers in hopper 21 from hopper 21 to drum 33 comes from air compressor 24. The air flow generated by air compressor 24 is routed through line 25 into conduit 22. The point of entry 37 of line 25 into conduit 22 is sealed and secure and a venturi is created within conduit 22 as a result of the pressurized air flow. The venturi effectively pulls these fibers from upstream (the hopper) as well as pushes fibers which are downnstream from the location of the venturi. The propelling air force from the air compressor can be introduced at virtually any point along the length of conduit 22 as well as introduced at the open top of the hopper 21 to create a pushing force. When the air flow from tube 25 is used to create the venturi effect, it is important that the reservoir of fibers be in relatively close proximity to the upstream side of the venturi.

The convenience of being able to empty the bags of fibers directly into the hopper 21 from ground level is only one convenience and improvement of the present invention. Since the bags of fibers do not have to be loaded into each truck drum, one drum at a time, Hopper 21 can be prefilled and kept filled and the fibers drawn forth from the hopper by control of air compressor 24. When a certain volume or weight of fibers is needed, the air compressor is turned on for some length of time allowing the venturi effect and air pressure to transport the fibers to the desired location. The longer the air compressor operates, the greater the number of fibers which are delivered from the hopper to the end-use location. It is also envisioned that with an accurately sized transport conduit from one end to the other, and by test data with regard to air compressor operation and the volume of fibers delivered, fiber volume or weight should be predictable based on the length of time the air compressor is operated. While some variation in the volume or weight may occur due to bunching of the fibers as well as nonuniform flow, it is believed that accurately monitoring the length of time that the air compressor is operated will provide a relatively accurate determination as to the volume or weight of fibers delivered to the remote location. Another feature of the present invention is water trap/drain 38 positioned in a low or the lowest point of conduit 22 in order to remove any moisture or condensation.

Figure 2:
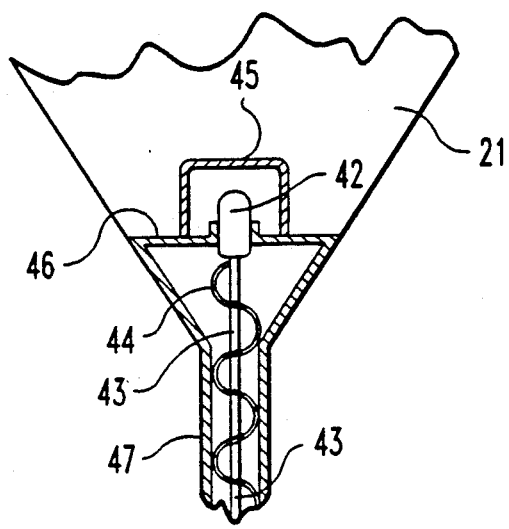
FIG. 2 is a diagrammatic illustration of an auger assembly which may be placed in the supply hopper of the FIG. 1 apparatus.

Referring to FIG. 2, there is illustrated another feature suitable for use as part of the present invention. In FIG. 2, hopper 21 is provided with a motor-driven auger 41 including drive motor 42, auger shaft 43 and auger blade 44. The motor is proteced by a shroud 45 and support bars 46 support the motor and the shroud in the encased and protected fashion which is illustrated. The auger shaft 43 and blade 44 extend from within the main body of the hopper down into feed tube 47. The outer diameter of the auger blade is just slightly smaller than the inside diameter of feed tube 47 such that for fibers to be transported from the hopper to the transport conduit 22, the fibers must be carried by the auger blade. The use of auger 41 allows a somewhat uniform flow to be created and the auger also serves to break up any clumped bundles of fibers. The auger blade creates a type of cutting action through the mass of fibers in the hopper. While the fibers are in fact discrete strands and while the auger blade does not actually cut through the strands, there is a chance that clumps of fibers will exist and these need to be broken up for the best distribution and uniform mix in the concrete. In lieu of the auger, hopper 21 can be configured with a vibratory motor to gently shake or vibrate the hopper for enhancing the feed of the fibers.

Figure 3:
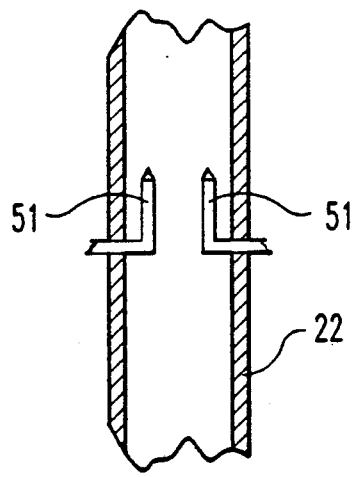
FIG. 3 is a diagrammatic illustration of separating needles which may be disposed in a plurality of locations within the delivery conduit for the particulate matter transported by the FIG. 1 apparatus.

A further feature which may be used as part of the present invention is illustrated in FIG. 3. Clump-breaking needles 51 which alternatively be clump-splitting blades are positioned at one or more locations in transport conduit 22 in order to separate and divide any clumps of fibers which may be drawn from the hopper by air pressure, by means of the venturi effect, by auger 41 or by a combination of these various transport mechanisms.

In the preferred embodiment, the hopper 21 has a two-part shape including a rectangular upper portion 60 and a lower funnel portion 61. The upper portion is dimensioned to be approximately 21 inches in length, 9 inches in depth and 15 inches wide. The funnel measures 9 inches by 15 inches and is approximately 9 inches high. A ledge 62 is provided adjacent the top edge of upper portion 60 for the support of the bag of fibers being emptied into the hopper. By use of this support ledge the bag of fibers can be supported and with one end overhanging into the hopper the end is cut open. The transport conduit is a three-inch diameter length of polyvinylchloride (PVC) tubing. Another feature of the present invention is that any joints between telescoped tubing members is from male to female in the direction of fiber flow so as to eliminate any edges which might tend to snag fibers as they move along through the conduit.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A transport apparatus for moving lengths of synthetic fibers from a supply location at or near ground or floor level into an elevated opening at a remote location comprising:
   a receptacle positioned at or near ground or floor level for receiving a supply of said lengths of synthetic fibers whereby said lengths of synthetic fibers can be loaded into said receptacle without having to elevate the user;
   a flexible conduit having a first end in flow communication with said receptacle, a second end for delivery of said lengths of synthetic fibers to said remote location, and defining an enclosed passageway between said first and second; and,
   air flow means cooperatively arranged with said flexible conduit for creating a propelling force on said lengths of synthetic fibers in the direction of said second end, wherein said air flow means includes an air compressor and an air tube which is inserted into said conduit.

2. The transport apparatus of claim 1 which further includes a motor-driven auger disposed in said receptacle.

3. The transport apparatus of claim 2 which further includes fiber separation means disposed within said conduit for separating said lengths of synthetic fibers.

4. A transport apparatus for moving lengths of synthetic fibers from a ground level location into the rotary drum of a cement truck comprises:
   a vertical-feed hopper into which said synthetic fibers are intially loaded;
   a flexible length of tubing with one end attached to said hopper and the other end positioned adjacent said rotary drum; and
   a source of pressurized air directed in a substantially horizontal direction including a connecting tube inserted into said tubing for creating a substantially horizontal venturi effect.

5. A method of moving lengths of synthetic fibers from a supply location at or near ground or floor level into an elevated and remote volume of concrete comprises:
   providing a vertical feed receptacle positioned at or near ground or floor level for receiving a supply of said lengths of synthetic fibers;
   connecting one end of a flexible conduit to said receptacle;
   positioning the other end of said flexible conduit adjacent said remote volume of concrete;
   providing an air compressor and output air line;
   inserting said air line into said flexible conduit; and
   energizing said air compressor to generate a substantially horizontal flow of air.

* * * * *